(12) United States Patent
Phelps (10) Patent No.: US 6,322,651 B1
(45) Date of Patent: Nov. 27, 2001

(54) METHOD FOR CONTINUOUSLY PRODUCING EXPANDED THERMOFORMABLE MATERIALS

(76) Inventor: Edwin F. Phelps, 583 Canoe Hill, New Canaan, CT (US) 06840

( * ) Notice: Subject to any disclaimer, the term of this patent is extended or adjusted under 35 U.S.C. 154(b) by 0 days.

(21) Appl. No.: 09/436,274

(22) Filed: Nov. 8, 1999

(51) Int. Cl.[7] .............................. B31D 3/02; B29C 51/40; B29C 51/42; B29C 51/00; B29C 65/02
(52) U.S. Cl. .................... 156/197; 156/308.4; 264/102; 264/164; 264/237; 264/404; 428/116; 425/384; 425/812; 425/817 C
(58) Field of Search ................................. 264/102, 164, 264/237, 404; 156/308.4, 197; 428/116; 425/384, 812, 817 C (56) References Cited

U.S. PATENT DOCUMENTS

| | | | |
|---|---|---|---|
| 2,502,304 | * 3/1950 | Baker . | |
| 4,113,909 | 9/1978 | Beasley | 428/116 |
| 4,148,954 | 4/1979 | Smarook | 428/116 |
| 4,164,389 | 8/1979 | Beasley | 425/406 |
| 4,172,916 | * 10/1979 | Watson | 428/86 |
| 4,264,293 | 4/1981 | Rourke | 425/407 |
| 4,269,586 | 5/1981 | Ronayne | 425/407 |
| 4,315,050 | 2/1982 | Rourke | 428/116 |
| 4,315,051 | * 2/1982 | Rourke | 428/119 |
| 4,543,147 | * 9/1985 | Noto et al. | 156/288 |
| 4,792,426 | * 12/1988 | Greatorex et al. | 264/284 |
| 5,087,500 | * 2/1992 | Kasper et al. | 428/116 |
| 5,648,027 | * 7/1997 | Tajiri et al. | 264/43 |

\* cited by examiner

Primary Examiner—Jan H. Silbaugh
Assistant Examiner—Michael I. Poe
(74) Attorney, Agent, or Firm—Ohlandt, Greeley, Ruggiero & Perle, LLP (57) ABSTRACT

A method for continuously producing expanded thermoformable materials comprising the steps of: conveying a thermoformable assembly by means of a conveyor through a plurality of heating zones, whereby the thermoformable assembly is heated to a temperature at which the thermoformable material adhesively bonds to the first and second mold plates; disposing the thermoformable assembly between an upper press plate and a lower press plate, and heating the thermoformable material to a temperature in the range between about 50° to 300°C. while moving the upper and lower press plates so as to effect an expansion of the cross-section of the thermoformable material; and conveying the expanded thermoformable material through a cooling zone, wherein the expanded thermoformable material is cooled to a temperature sufficient for maintaining its structural integrity.

17 Claims, 9 Drawing Sheets

METHOD FOR CONTINUOUSLY PRODUCING EXPANDED THERMOFORMABLE MATERIALS

BACKGROUND OF THE INVENTION

1. Field of the Invention

The present invention relates to a method of producing expanded thermoformable materials and, more particularly, to an energy efficient method for continuously producing expanded thermoformable materials.

2. Description of the Prior Art

Processes used to make expanded thermoformable materials typically involve placing a thermoformable polymeric material blank between mold plates, which are attached to a heated press. The thermoformable polymeric material blank is heated to a temperature at which the thermoformable material will adhesively bond with the mold plates by hot tack adhesion. The mold plates are than separated apart with the thermoformable material still adhered to the mold plates so as to effect an expansion of the cross-section of the thermoformable material.

Typically, the surfaces of the mold plates that are bonded to the thermoplastic material blank have a plurality of perforations thereon. The thermoplastic material will adhesively bond to the non-perforated portion of this surface so that when the mold plates are separated apart a plurality of cells will be formed within the cross-section of the expanded thermoformable material. Generally, these perforations can have a variety of different geometries and can be arranged in an array of patterns on the surface of the mold plates, thereby creating thermoformable materials having a variety of cross-sectional geometries Such methods for expanding thermoformable materials are set forth in U.S. Pat. No. 4,113,909 (Beasley), issued Sep. 12, 1978, U.S. Pat. No. 4,164,389 (Beasley), issued Aug. 14, 1979, U.S. Pat. No. 4,315,051 (Rourke), issued Feb. 9, 1982, U.S. Pat. No. 4,269,586 (Ronayne), issued May 26, 1981, U.S. Pat. No. 4,264,293 (Rourke), issued Apr. 28, 1981, and U.S. Pat. No. 4,315,050 (Rourke), issued Feb. 9, 1982, each of which is incorporated herein by reference.

The problem with these processes is that the manufacturing personnel must wait approximately fifteen to twenty minutes until the expanded thermoformable material has cooled off before they can remove it from the press and insert a new thermoformable blank. Thus, the cost of production is increased because the manufacturing personnel must wait long periods of time before each new thermoformable material blank can be inserted into the press.

Another disadvantage is that if expanded thermoformable materials with different cross-sectional geometries is desired, than the mold plates must be replaced in the press to produce the desired product. This causes several problems. First, the manufacturing personnel must wait for the previous expanded thermoformable material product to cool off so that it can be removed. Second, they must also wait for the entire press to cool off so that it reaches a safe temperature before the manufacturing personnel can again work with the press. The mold plates can be heated to temperatures in excess of 300° C., which creates dangerous conditions if the manufacturing personnel are not cautious. If they attempt to remove the mold plates before they are completely cooled off, grave injuries or even death could occur. Thus, the cost of production is increased if a variety of expanded thermoformable materials are desired because of the additional time and precautions which the manufacturing personnel must take when replacing the mold plates.

Another disadvantage is that the thermoplastic material is heated and cooled in the same zone. Each thermoformable material sheet that is to be expanded must be heated in the press from room temperature to the temperature at which the material will exhibit hot tack adhesion. Thus, additional time is required because the thermoplastic material sheet is not pre-heated prior to its insertion into the press.

In addition, the cost of production is substantially increased because of the a mount of wasted energy in these conventional processes. Each thermoformable material must be reheated using new energy due to the fact that the press must be cooled to near room temperature prior to removal of expanded thermoformable material and insertion of a new sheet of thermoformable material. Thus, the cost of production is increased because new energy must be purchased to heat each new sheet of thermoformable material that is to be expanded and all of such energy is wasted during the cooling process.

Furthermore, another disadvantage is that the processes described above are neither automated nor continuous, and typically require multiple manufacturing personnel to produce one expanded thermoformable product. Obviously, the use of multiple personnel greatly increases the cost of manufacturing, together with the long product cycle times and energy loss.

Accordingly, there is a need for an improved method of continuously producing expanded thermoformable materials that avoids the aforementioned disadvantages. In this regard, the present inventor has developed a unique continuous process, which substantially reduces product cycle time, labor costs and energy consumption. That is, only one member of the manufacturing team is required for loading and unloading of the thermoplastic material.

SUMMARY OF THE INVENTION

The present invention provides an energy efficient method for continuously producing expanded thermoformable materials. This method comprises the steps of: conveying a thermoformable assembly having a thermoformable material disposed between a pair of mold or caul plates through at least one heating zone; expanding the heated thermoformable material in a press zone; and cooling the expanded thermoformable material in at least one cooling zone. Optionally, the cooled expanded thermoformable material is returned to the thermoformable material sheet loading station, wherein the expanded thermoformable material is removed from the mold plates and a new thermoformable material sheet is disposed therebetween for subsequent treatment in the continuous system.

Specifically, the thermoformable assembly is heated to a temperature at which the thermoformable material adhesively bonds to each mold plate. Thereafter, the thermoformable assembly is disposed between a pair of press plates, whereby the press plates engage the mold plates of the thermoformable assembly. The thermoformable material sheet, which is disposed between the mold plates, is then heated to a temperature in the range between about 50° C. to 300° C., preferably between 100° C. to 250° C., and the press plates are thereafter slowly separated so as to effect an expansion of the cross-section of the thermoformable material to the desired width. The surface of the mold plates which comes into contact with the thermoformable material may have perforations thereon, thereby creating cells in the cross-section of the expanded thermoformable material during the expansion process. Alternatively, each set of mold plates may have either the same or different diameter perforations thus enabling the creation of expanded thermoformable material having different or the same cell cross-sections.

The thermoformable assembly, which has been expanded, is then removed from the press zone and conveyed through at least one cooling zone, wherein the expanded thermoformable material is cooled to a temperature sufficient for maintaining its structural integrity.

In one embodiment of the present invention, the heating, press, and cooling zones are enclosed within a housing capable of capturing heat from each individual heating, press and cooling zone, and recycling it so that heat applied to prior thermoformable assemblies can be reused to heat a subsequent thermoformable assembly, thereby conserving energy by recycling heat during operation of the continuous process.

The present invention is continuous, i.e., a conveyorized mechanism is used to move a plurality of thermoformable assemblies through various heating, press (i.e., expansion) and cooling zones, whereby an expanded thermoformable material is produced about every 1–2 minutes.

Other and further objects, advantages and features of the present invention will be understood by reference to the following specification in conjunction with the annexed drawings, wherein like parts have been given like numbers.

DESCRIPTION OF THE INVENTION

The present invention can best be described by reference to the attached figures, wherein FIGS. 1 through 5 depict the energy efficient continuous system 20 which is capable of producing expanded thermoformable material. System 20 preferably comprises a first conveyor means 22, a second conveyor means 24 enclosed within housing 36. First conveyor means 22 includes a plurality of heating zones 26, a heatable press zone 30, and a plurality of product cooling zones 34. A thermoformable assembly 38 comprising a first mold plate 40, a second mold plate 42, and a thermoformable material sheet 48 disposed therebetween is placed on a first conveyor means 22 for conveying through heating zones 26. Preferably, first mold plate 40 and second mold plate 42 are made of aluminum and are 3 to 4 millimeters in width.

Figure 1:
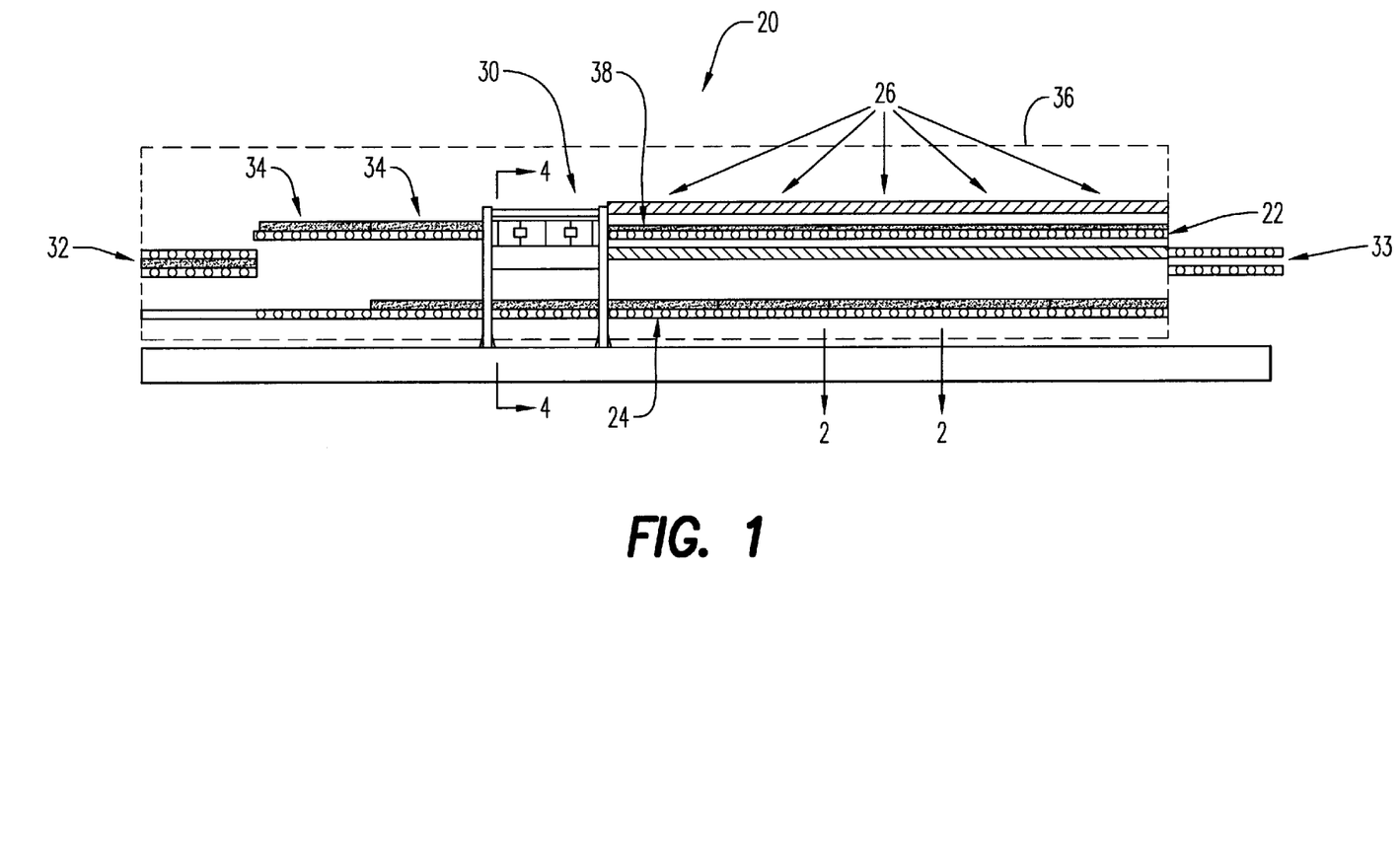
FIG. 1 is a schematic view of the system for continuously producing expanded thermoformable materials according to the present invention.
Figure 2:
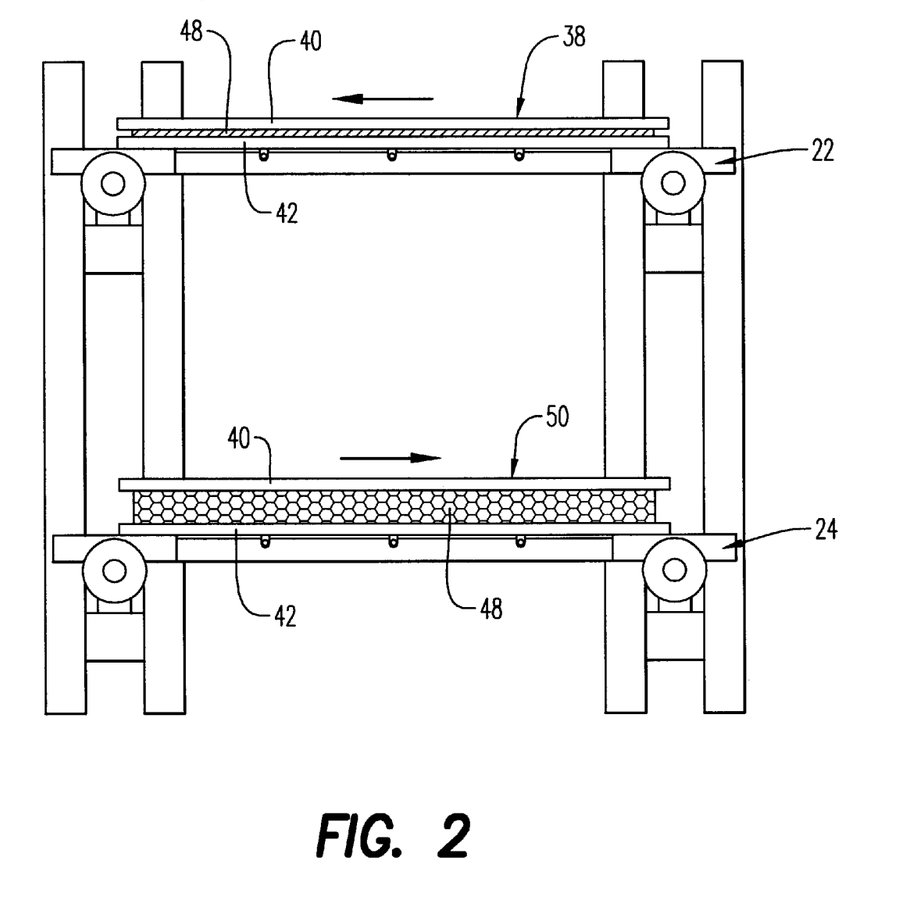
FIG. 2 is a side cross-sectional view along line 2—2 of FIG. 1 depicting a single thermoformable assembly traversing through a heating zone prior to expansion which is disposed on top of the finished product return conveyor.
Figure 3:
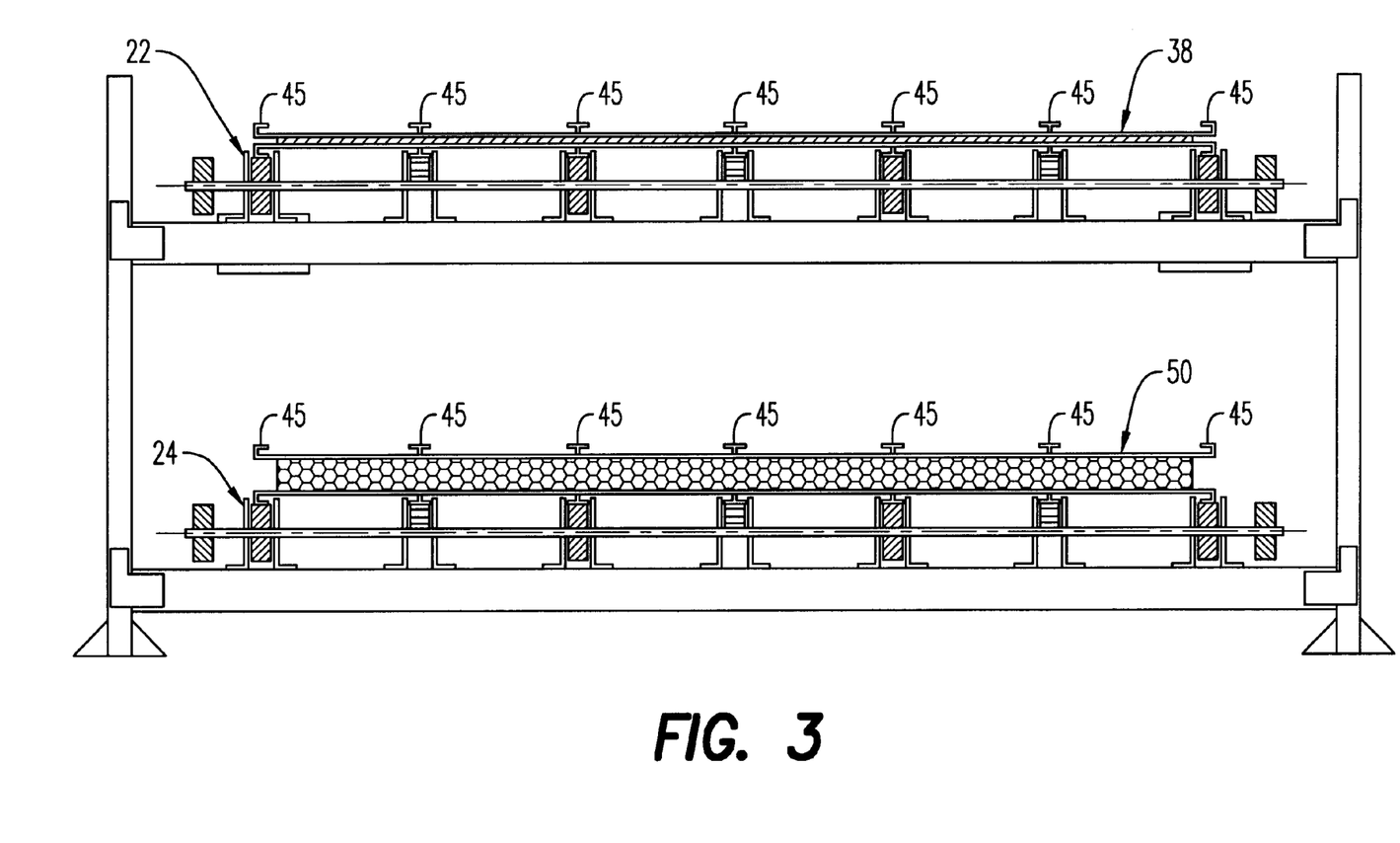
FIG. 3 is a front cross-sectional view of FIG. 2.

As thermoformable assembly 38 is conveyed through heating zones 26, thermoformable material sheet 48 is heated to a temperature at which thermoformable material sheet 48 will adhesively bond to the surfaces of first mold plate 40 and second mold plate 42 by hot tack adhesion.

Figure 4:
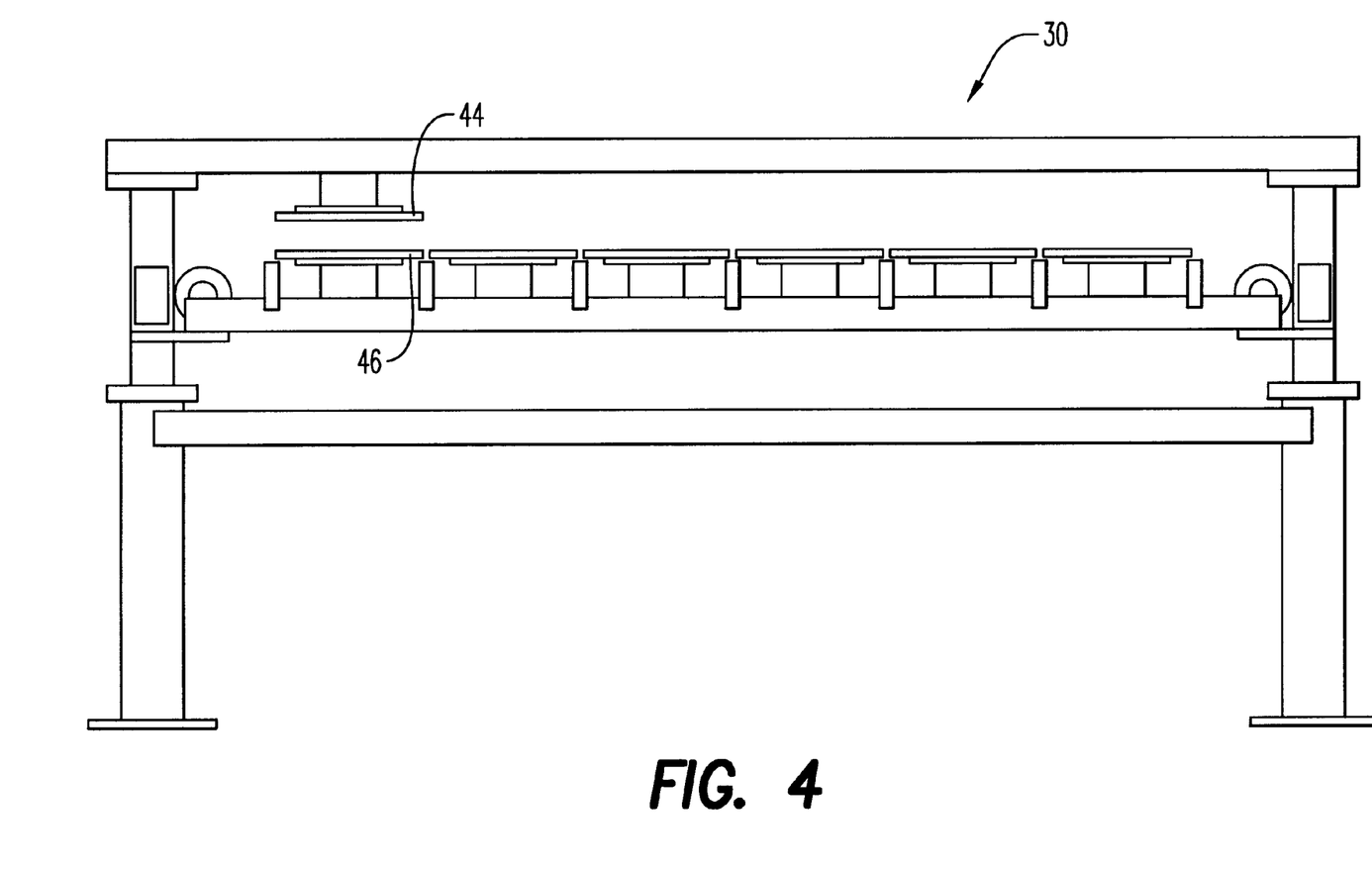
FIG. 4 is a cross-sectional view along line 4—4 of FIG. 1 depicting the press zone without any thermoformable assembly disposed between the press plates.
Figure 5:
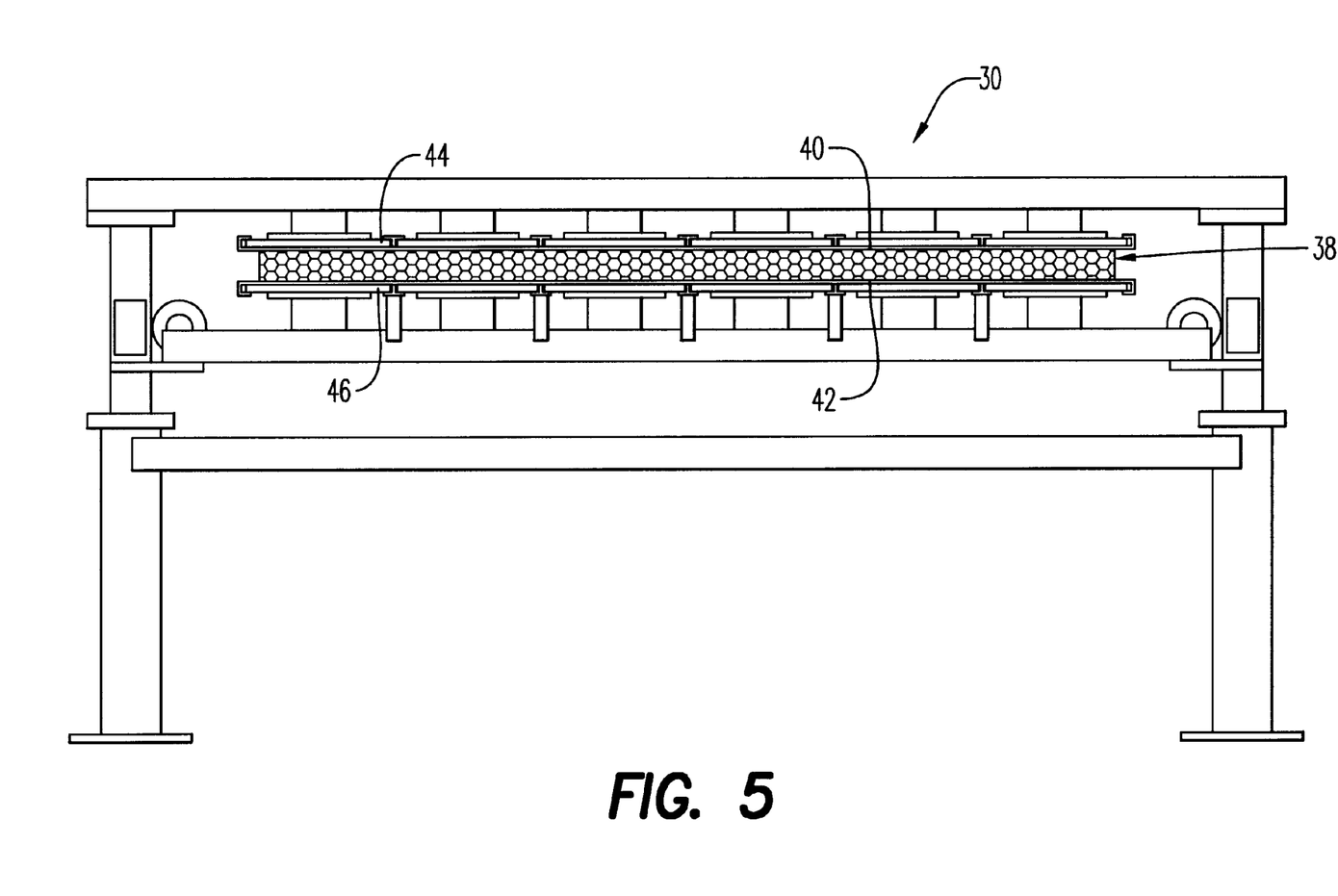
FIG. 5 is a cross-sectional view along line 4—4 of FIG. 1 depicting the press zone with a thermoformable assembly disposed between the press plates after the press plates have been retracted to form an expanded thermoformable material.

Press zone 30 includes an upper press plate 44 and a lower press plate 46. Thermoformable assembly 38 is conveyed into press zone 30 where it is disposed between upper press plate 44 and lower press plate 46. Thermoformable assembly 38 is secured to upper press plate 44, via connectors 45, which slidably engage upper mold plate 40 to upper press plate 44. Similarly, lower mold plate 42 is simultaneously engaged with lower press plate 46. Upper press plate 44 and lower press plate 46 are heated via electric resistance heaters disposed within each press plate (not shown), whereby thermoformable material 48 is heated conductively through upper press plate 44 and lower press plate 46 to a temperature in the range between about 50° and 300° C., preferably between 100° and 250° C.. Thereafter, upper press plate 44 and lower press plate 46 are separated so as to effect an expansion of the cross-section of thermoformable material 48.

Figure 6:
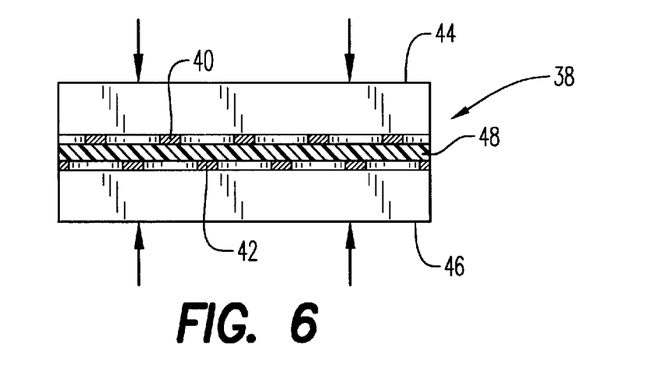
FIG. 6 is a schematic representation of a thermoformable material sheet disposed between a pair of mold plates.
Figure 7:
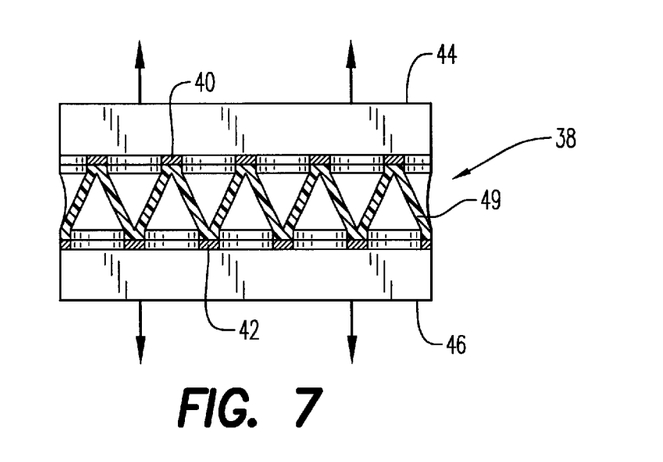
FIG. 7 is a schematic representation of the thermoformable material sheet disposed between a pair of mold plates which have been partially retracted by associated press plates (not shown)
Figure 8:
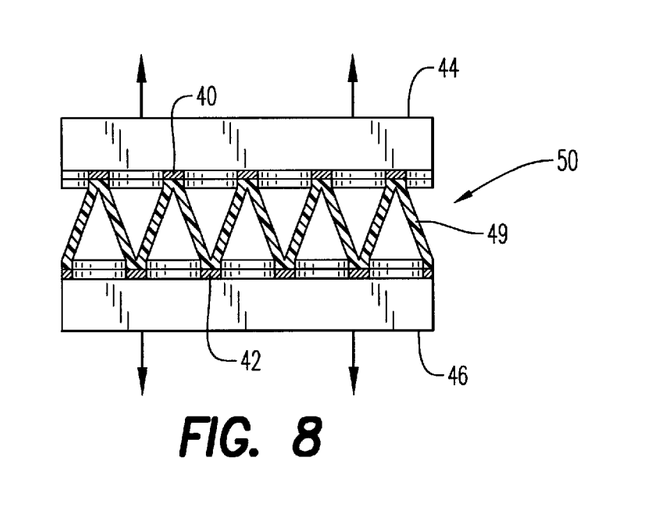
FIG. 8 is a schematic representation of the thermoformable material sheet disposed between a pair of mold plates which have been fully retracted to produce an expanded thermoformable material.

FIGS. 6 through 8 show a sequence of schematic representations depicting the expansion of the cross-section of thermoformable material 38 while in press zone 30. FIG. 6 shows thermoformable assembly 38 when it enters press zone 30, whereby thermoformable assembly 38 is disposed between upper press plate 44 and lower press plate 46. FIG. 7 shows upper press plate 44 and lower press plate 46 as they begin to separate from each other and expand thermoformable material 48 which is adhered to the adjacent surfaces of first mold plate 40 and second mold plate 42, respectively. FIG. 8 depicts the fully expanded thermoformable material 50 after the expansion step but before expanded thermoformable material 50 is removed from press zone 30.

A significant feature of the present invention is the construction of thermoformable assembly 38. First mold plate 40 and second mold plate 42 are disposed about opposite surfaces of thermoformable material 48 prior to the placement of thermoformable assembly 38 onto first conveyor means 22. First mold plate 40 and second mold plate 42 remain loosely attached to thermoformable material 48, i.e. without the use of restraints, until thermoformable material 48 is raised to a temperature at which it will exhibit hot tack adhesion. Thereafter, first mold plate 40 and second mold plate 42 are adhesively bonded to thermoformable material 48 and remain bonded throughout the entire process, until thermoformable assembly 38 is cooled to a temperature in the range between about 10° to 30° C. When expanded thermoformable material 49 is cooled to a temperature within this range it easily releases from first mold plate 40 and second mold plate 42. This novel process substantially increases the rate of production of expanded thermoformable materials by allowing consecutive thermoformable assemblies 38 to be placed on first conveyor means 22. Each thermoformable material sheet 48 is disposed between its own pair of mold plates, i.e., first mold plate 40 and second mold plate 42. This eliminates the need for waiting for expanded thermoformable assembly 50 to cool before removing it from the press zone 30. Energy efficient method of the present invention allows each expanded thermoformable material 49 to be rapidly removed after the pressing process, thereby allowing the next consecutive thermoformable material 38 to be inserted into the press zone 30 without waiting for a cooling period. Thus, the energy efficient process according to the present invention can produce an expanded thermoformable material 49 about every 1–2 minutes versus the old batch method, which produced approximately one expanded thermoformable material in about 15–20 minutes.

Figure 9:
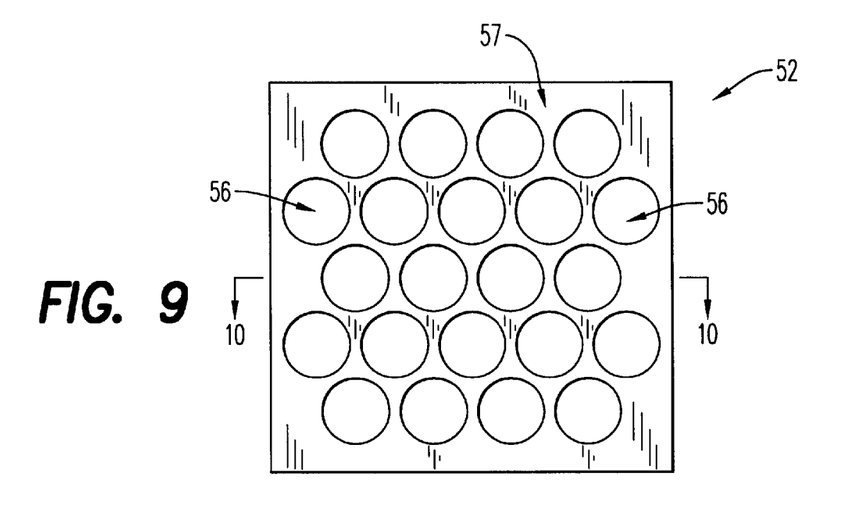
FIG. 9 illustrates a top plan view of the perforated surface of a mold plate.
Figure 10:
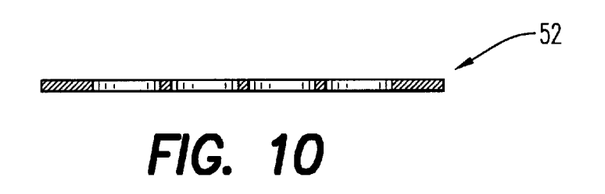
FIG. 10 is a cross-sectional view along line 10—10 of FIG. 9.
Figure 11:
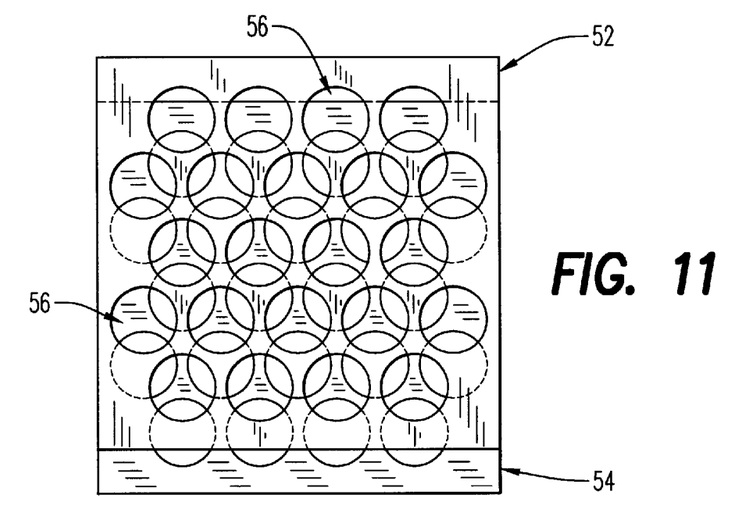
FIG. 11 illustrates, in a perspective view, a pair of oppositely disposed mold plates demonstrating the non-alignment between the perforations from one mold plate with those of another which provides for the formation of the unique honeycomb structure of the expanded thermoformable material of the present invention.

Optionally, first mold plate 40 includes a perforated surface 52 and second mold plate 42 includes a perforated surface 54 which is disposed opposite to perforated surface 52. FIGS. 9 through 11 show perforated surface 52 and perforated surface 54 with a plurality of perforations 56 thereon. Perforated surface 52 and perforated surface 54 are disposed opposite to one another and have thermoformable material 48 disposed therebetween, whereby perforated surface 52 and perforated surface 54 are in contact with opposite sides of thermoformable material 48.

During the heating and expansion steps, thermoformable material 48 adheres to the non-perforated portion 57 of perforated surface 52 and perforated surface 54, by hot tack adhesion. When upper press plate 44 and lower press plate 46 are separated or retracted in press zone 30, a plurality of cells 58 are formed in the expanded thermoformable material 50, as depicted in FIGS. 12–15, wherever perforations 56 are disposed on perforated surface 52 and 54. In addition, a plurality of ribs 60 are formed in the expanded thermoformable material 49 at the non-perforated portion 57 of first perforated surface 52 and second perforated surface 54 of first mold plate 40 and second mold plate 42, respectively.

During the expansion process, cells 58 can be vented through first mold plate 40 and second mold plate 42 so that pressure within cells 58 will be in equilibrium with the pressure without the ribs 60 of the thermoformable material 48, thereby preserving the pattern and integrity of the cells 58 within the cross-section of the expanded thermoformable assembly 38.

Another significant feature of the present invention is that perforations 56 on first perforated surface 52 and second perforated surface 54 may be arranged in different configurations for each consecutive thermoformable assembly 50. In addition, first perforated surface 52 and second perforated surface 54 can be aligned in different patterns, such that perforations 56 on first perforated surface 52 can overlap perforations 56 on second perforated surface 54. Thus, producing expanded thermoformable material 50 with a different array of cells 58 and ribs 60 on opposite sides of thermoformable material sheet 48.

Another significant feature is that perforations 56 may have many different geometries, such as arcuate or straight sides. Thus, the present invention can continuously produce expanded thermoformable material 49 of varied cross-sectional wall geometries without having to shut down for recalibration.

Figure 12:
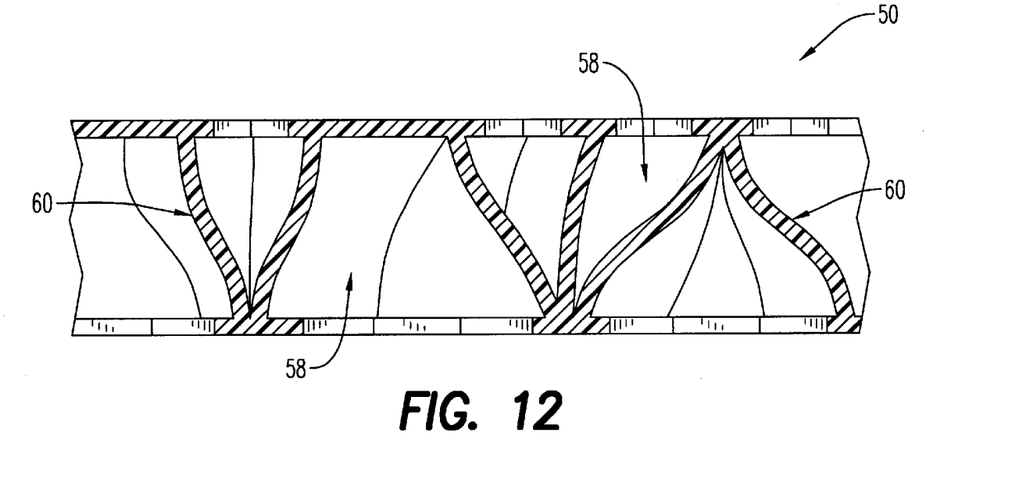
FIGS. 12–15 show different expanded thermoformable materials, which may be made using the method of the present invention.
Figure 13:
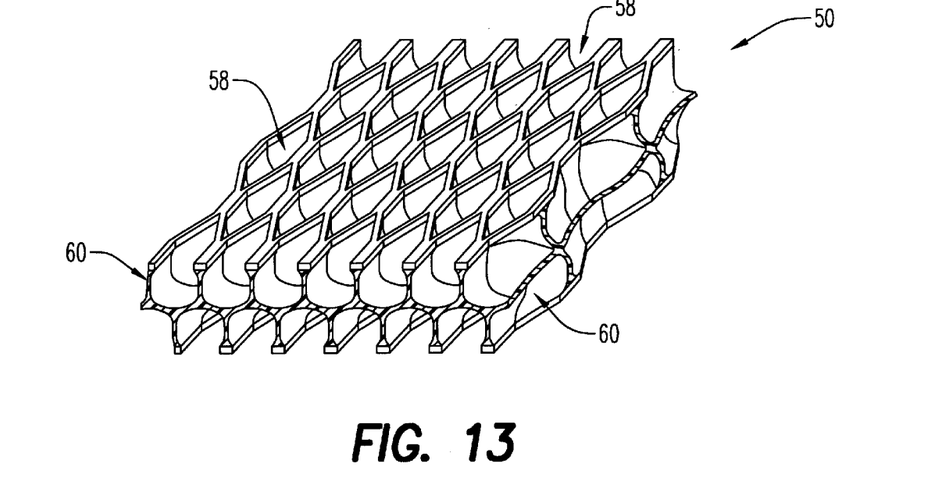

FIGS. 12 through 15 show several expanded thermoformable materials 49 with cells 58 and ribs 60. FIG. 12 shows a cross-section view of expanded thermoformable material 49 formed according to the present invention, and FIG. 13 shows a front top view of the expanded thermoformable assembly 50 which has its top layer removed to clearly depict cells 58 and ribs 60. Perforations 56 of first mold plate 40 and second mold plate 42, which made cells 58 and ribs 60 of FIGS. 12 and 13, were diamond shaped.

Figure 14:
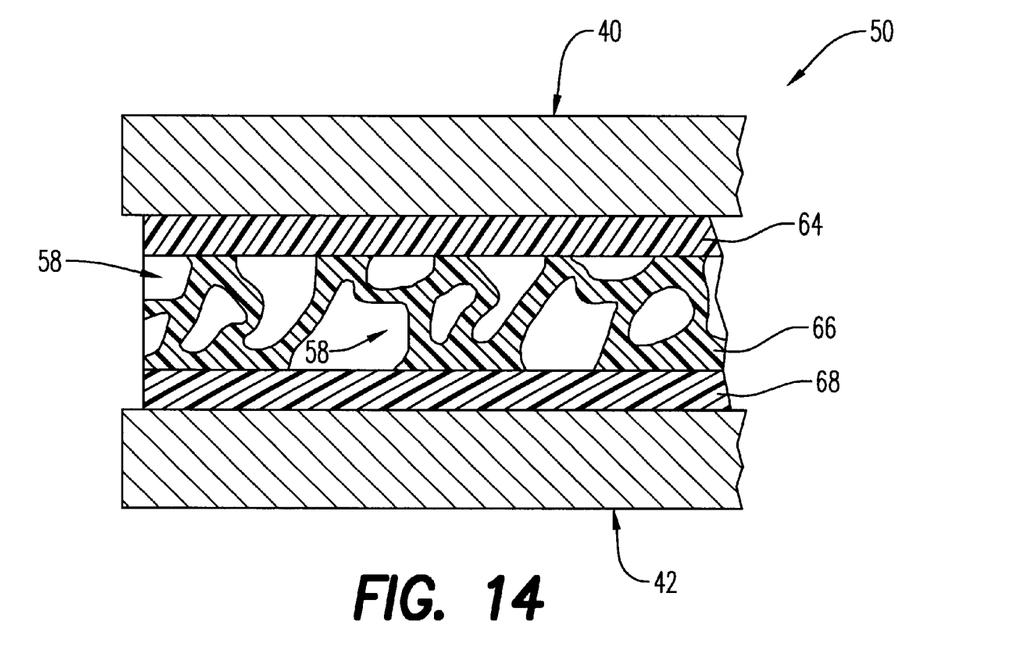
Figure 15:
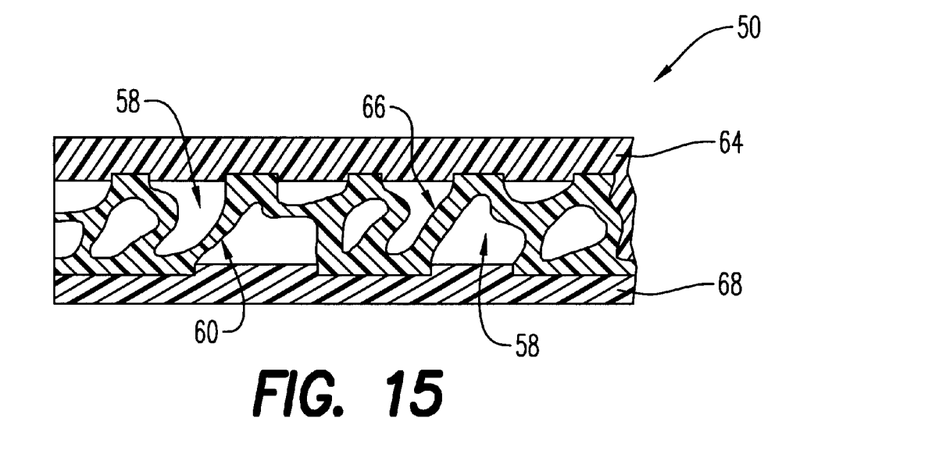

FIGS. 14 and 15 show cross-sectional views of another type of thermoformable assembly 38 comprising a first thermoformable material layer 64, second thermoformable material layer 68, and an expanded thermoformable material layer 66 which is disposed between layers 64 and 68.

Referring again to FIGS. 1 through 5, expanded thermoformable assembly 50 is removed from press zone 30 and conveyed through cooling zones 34, whereby expanded thermoformable material 49 is cooled to room temperature. Cooling zones 34 cool expanded thermoformable material 49 by means of forced cooled air. Elevator 32 lowers expanded thermoformable assembly 50 from first conveyor means 22 to second conveyor means 24. Second conveyor means 24 conveys and further cools expanded thermoformable assembly 50 to a second elevator 33, whereby expanded thermoformable assembly 50 is elevated to a removal dock where manufacturing personnel can remove it.

Housing 36 encloses all the components of energy efficient system 20. Thermoformable assembly 38 is placed on first conveyor means 22 at one end of housing 36 and expanded thermoformable assembly 50 exits out the same end by means of second elevator 33. The entire process according to the present invention is automated, thereby allowing manufacturing personnel to consecutively place thermoformable assemblies 38 onto first conveyor means 22 and thereafter wait for the final product, expanded thermoformable assembly 50, to exit out by second elevator 33.

During the heating process, housing 36, which is insulated by materials such as polyurethane, prevents heat from escaping each heating zone 26. Heat applied to one thermoformable material assembly 38 in heating zones 26 will be recycled and used again for the next consecutive thermoformable material assembly 38. In addition, housing 36 utilizes ducts (not shown) to capture heat emitted from expanded thermoformable assemblies 50 in cooling zones 34 and transfer it to heating zones 26, wherein this captured heat is also applied to subsequent thermoformable material assemblies 38. Heat captured from cooling zones 34 is also transferred by ducts 76 to a dryer 74, wherein dryer 74 removes moisture from thermoformable material 48 prior to its insertion onto the first conveyor means 22. Thus, the energy efficient system 20 reduces energy needs by about 80% versus conventional methods.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A method for continuously producing expanded thermoformable materials comprising:

(a) conveying at least one thermoformable assembly through at least one heating zone, said thermoformable assembly comprising a thermoformable material disposed between first and second mold plates, whereby said thermoformable assembly is heated to a temperature to cause said thermoformable material to adhesively bond to said first and second mold plates while said thermoformable assembly is conveyed through said heating zone;

(b) disposing said thermoformable assembly between an upper press plate and a lower press plate such that said upper press plate is engaged with said first mold plate and said lower press plate is engaged with said second mold plate;

(c) further heating said thermoformable material to a temperature in the range between about 50° C. to 300° C. in a press zone;

(d) moving said upper and lower press plates so as to effect an expansion of the cross-section of said thermoformable material, thereby forming an expanded thermoformable material in said press zone; and (e) conveying said expanded thermoformable material from said press zone through at least one cooling zone, wherein said expanded thermoformable material is cooled to a temperature in the range between about 10° C. to 30° C.

2. The method of claim 1, further comprising the step of repeating steps (a) through (e) for processing consecutive thermoformable assemblies.

3. The method of claim 1, further comprising the step of disengaging said upper and lower press plates from said first and second mold plates subsequent to step (d).

4. The method of claim 1, wherein said thermoformable material is heated in step (c) to a temperature in the range between about 100° C. to 250° C.

5. The method of claim 1, wherein said thermoformable assembly is heated in step (c) for about 40 seconds.

6. The method of claim 1, further comprising capturing heat from steps (a) through (e) for use as a heat source in steps (a) and (c).

7. The method of claim 1, wherein said thermoformable material comprises at least one thermoformable sheet and at least one expanded thermoformable material.

8. The method of claim 1, wherein the heating in said step (c) is performed by means of electrical heating elements disposed in said upper press plate and said lower press plate whereby said thermoformable material is heated conductively through said upper press plate and said lower press plate.

9. The method of claim 1, wherein said first and second mold plates are made of aluminum.

10. The method of claim 1, wherein said first and second mold plates are about 3 to 4 millimeters in width.

11. The method of claim 1, wherein step (b) is performed after step (a).

12. The method of claim 1, wherein said first and second mold plates have a perforated surface positioned such that said perforated surfaces are each adjacent to a surface of said thermoformable material.

13. The method of claim 12, further comprising the step of repeating steps (a) through (e) for processing consecutive thermoformable assemblies, and wherein the perforated surfaces of at least two of said consecutive thermoformable assemblies have different patterns of perforations.

14. The method of claim 1, wherein said expanded thermoformable material comprises a plurality of cells separated by expanded ribs of said thermoformable material.

15. The method of claim 14, further comprising the step of venting said plurality of cells during step (d), to equilibrate the pressure within said cells with the pressure without said thermoformable material and thereby preserving the pattern and integrity of said cells in the resulting cross-sectional geometry.

16. The method of claim 1, wherein said thermoformable assembly includes connectors that engage and disengage from said upper and lower press plates.

17. The method of claim 16, wherein said connectors slidably engage and disengage from said upper and lower press plates.

* * * * *

(12) REEXAMINATION CERTIFICATE (4780th)
United States Patent
Phelps (10) Number: US 6,322,651 C1
(45) Certificate Issued: May 13, 2003

(54) METHOD FOR CONTINUOUSLY PRODUCING EXPANDED THERMOFORMABLE MATERIALS

(75) Inventor: Edwin F. Phelps, 583 Canoe Hill, New Canaan, CT (US) 06840

(73) Assignee: Edwin F. Phelps, New Canaan, CT (US)

Reexamination Request:
No. 90/006,255, Mar. 22, 2002

Reexamination Certificate for:
Patent No.: 6,322,651
Issued: Nov. 27, 2001
Appl. No.: 09/436,274
Filed: Nov. 8, 1999

(51) Int. Cl.[7] .................. B29C 51/40; B29C 51/42; B29C 51/00; B29C 65/02; B31D 3/02
(52) U.S. Cl. .................. 156/197; 156/308.4; 264/102; 264/164; 264/237; 264/404; 425/384; 425/812; 425/817 C; 428/116
(58) Field of Search .................. 264/102, 154, 264/164, 237, 320, 404; 425/384, 812, 817 C; 156/197, 308.4; 428/116

(56) References Cited

U.S. PATENT DOCUMENTS

| | | |
|---|---|---|
| 3,170,189 A | 2/1965 | Hutter |
| 3,359,600 A | 12/1967 | O'Brien et al. |
| 3,642,411 A | 2/1972 | Desnick et al. |
| 3,765,810 A | 10/1973 | Smarook |
| 3,919,381 A | 11/1975 | Smarook |
| 4,070,515 A | 1/1978 | Smarook |
| 4,148,954 A | 4/1979 | Smarook |
| 4,543,147 A | 9/1985 | Noto et al. |
| 5,641,371 A | 6/1997 | Sanko |

*Primary Examiner*—Leo B. Tentoni (57) ABSTRACT

A method for continuously producing expanded thermoformable materials comprising the steps of: conveying a thermoformable assembly by means of a conveyor through a plurality of heating zones, whereby the thermoformable assembly is heated to a temperature at which the thermoformable material adhesively bonds to the first and second mold plates; disposing the thermoformable assembly between an upper press plate and a lower press plate, and heating the thermoformable material to a temperature in the range between about 50° to 300° C. while moving the upper and lower press plates so as to effect an expansion of the cross-section of the thermoformable material; and conveying the expanded thermoformable material through a cooling zone, wherein the expanded thermoformable material is cooled to a temperature sufficient for maintaining its structural integrity.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–17, dependent on an amended claim, are determined to be patentable.

1. A method for continuously producing expanded thermoformable materials comprising:
   (a) conveying at least one thermoformable assembly through at least one heating zone, said thermoformable assembly comprising a thermoformable material disposed between first and second mold plates, whereby said thermoformable assembly is heated to a temperature to cause said thermoformable material to adhesively bond to said first and second mold plates while said thermoformable assembly is conveyed through said heating zone;
   (b) disposing said thermoformable assembly between an upper press plate and a lower press plate such that said upper press plate is engaged with said first mold plate and said lower press plate is engaged with said second mold plate;
   (c) further heating said thermoformable material to a temperature in the range between about 50° C. to 300° C. in a press zone;
   (d) moving said upper and lower press plates so as to *separate from one another to thereby* effect an expansion of the cross-section of said thermoformable material, thereby forming an expanded thermoformable material in said press zone; and
   (e) conveying said expanded thermoformable material from said press zone through at least one cooling zone, wherein said expanded thermoformable material is cooled to a temperature in the range between about 10° C. to 30° C.

\* \* \* \* \*